United States Patent Office 2,942,465
Patented June 28, 1960

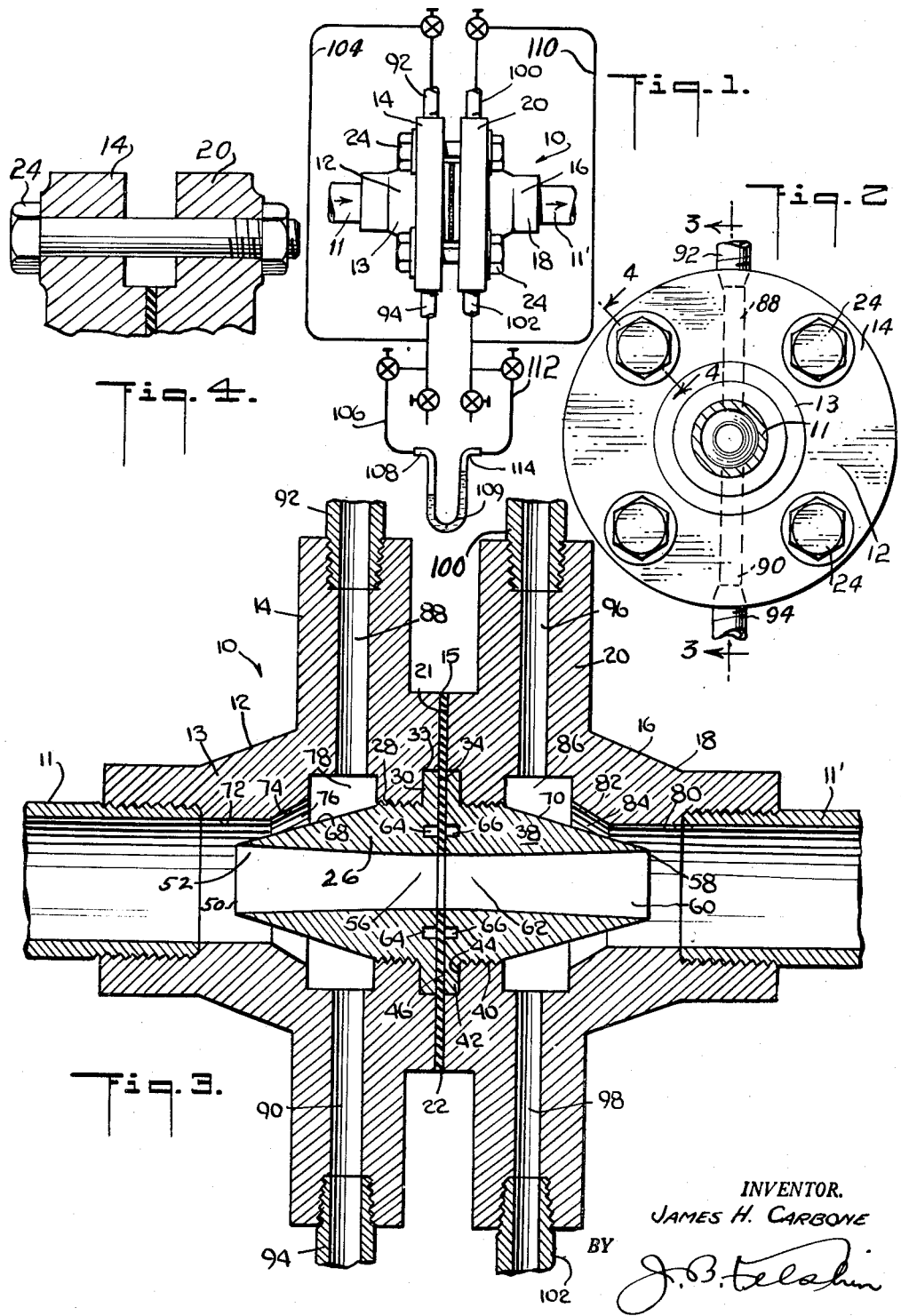

2,942,465
FLUID FLOW METER

James H. Carbone, Baldwin, N.Y.; Nettie Frishman Carbone, Martinsburg Pike, Silver Star Rte. Winchester, Va., executrix of said James H. Carbone, deceased Filed Feb. 23, 1955, Ser. No. 490,015

2 Claims. (Cl. 73—211)

This invention relates to fluid flow metering devices and to such devices employing the Venturi tube principle for use in indicating, registering, regulating, measuring or recording the flow of fluid in a pipe line or the like, and, in particular, a device capable of so doing by impact pressure differential, static pressure differential, or their difference, the velocity pressure.

Heretofore, when it was desired to meter the flow of a fluid, such as water, oil, steam, air or the like passing a selected region in a conduit, pipe or duct, some type of detecting apparatus was inserted in the pipe, for example, between the flanges of a flanged union. Thus, in designing such a line, special provision must be made in the line at a union for the interposition of such a metering device which is generally of such size and kind that it cannot be placed just anywhere in the line. It must be placed in a straight run of pipe of considerable length. For example, ordinarily such a device could not be placed at a bend in a line. Thus, such an arrangement of line and metering apparatus is comparatively inflexible and wasteful of space.

In addition, where fluid flow metering apparatus is inserted in a line between the flanges of a union, comparatively fine machining of many surfaces is required. For example, the surfaces of portions of the metering device which abut each other and which abut the flanges of the union must ordinarily be machined to provide critical tolerances. In addition, such devices must be accurately manufactured and positioned in the fluid flow line to provide the proper alignment of all of the fluid flow orifices in the line, in the flanges of the union, and in the metering apparatus. Thus, the foregoing types of flow lines and metering devices are undesirably complex and critical and expensive to manufacture.

Accordingly, an important object of this invention is to provide a fluid flow pressure sensitive and metering device of new and improved form.

Another object of the invention is to provide an improved fluid flow pressure sensitive and metering device which is comparatively small in size and may be positioned at substantially any desired union in a fluid flow line.

A further object of this invention is to provide an improved fluid pressure flow metering device which requires a minimum of highly critical machining for proper positioning in a fluid flow line or to achieve proper alignment with the flow passages in a fluid flow line.

Still another object of the invention is to provide an improved fluid flow pressure indicating device which is readily aligned with fluid flow passages in a fluid flow line.

Still another object of the invention is to provide an improved fluid flow pressure sensitive or metering device employing the Venturi tube principle to specifically register the velocity pressure directly on a manometer.

In general, the principles and objects of the invention are accomplished in a device comprising a pair of flanged members which may be directly substituted for the flanges of a flanged union in a fluid flow line and which include a pair of nozzles, one in each flange, designed so that they are contained completely within the flange and do not extend beyond the end faces thereof which are secured together to form a union. The nozzles each have a fluid flow passage extending therethrough, said passages being aligned with each other and with the passages through the flanges and through the main body of the fluid flow line. In addition, the fluid flow passages through the nozzles are tapered to provide a continuous fluid flow path having a varying cross-sectional area whereby regions of varying fluid velocity are present therein. Thus, the nozzle flow passages provide a Venturi-type of fluid flow passage.

An external annular pressure communicating passage is also provided between the outer surface of each of the nozzles and the inner wall of the flanges. In one embodiment of the invention, the external passage is also tapered to provide Venturi-type action and leads to an annular pressure chamber around each nozzle. One or more radial passages lead away from each pressure chamber and the radial passages of one flange may be connected to one side of an indicating device, for example, a manometer and the radial passages of the other flange may be connected to the other side of the monometer so that the difference in pressure in each of the pressure chambers is thereby indicated.

The present invention provides a Venturi-type meter to develop a velocity pressure which is registered directly on a manometer. This is due to the fact that there is an impact due to a passage inclined to the line of flow, whereas, in prior devices, the manometer was connected to passages at right angles to the line of flow and only static pressure was read.

According to various embodiments of the invention, the diameter of each of the nozzles may be varied in size with respect to the passages through the fluid flow pipes connected to the flanges and the position of the openings of the nozzles in these pipes may be varied so that the device may be employed to measure the impact pressure, velocity pressure and the static pressure. Also, the size, shape, bore, and passage of one nozzle may be made to differ from those in the other nozzle, so as to affect a proportionate increase or decrease in velocity or pressure in each flange.

While the invention is illustrated in connection with flanged fittings and flanged unions, it is not to be taken as a limitation of the adaptation of the principles involved. In the art it is recognized that in general pipe 2" in diameter and smaller is made for pipe fittings without flanges, and the flanges and flanged unions are applied to piping larger than 2" in diameter. The principles and object of the invention apply to piping and fittings whether flanged or not.

The invention is described in greater detail by reference to the drawings wherein:

Fig. 1 is an elevational view of a portion of a fluid flow line and a flanged union therein in which a first embodiment of the invention is employed and a schematic representation of tubing or piping connections employed therein;

Fig. 2 is an end view, partly in section, of the flanged union shown in Fig. 1;

Fig. 3 is a sectional view along the line 3—3 in Fig. 2;

Fig. 4 is a sectional view along the line 4—4 in Fig. 2.

Referring to Fig. 1 and Fig. 3, a presently preferred embodiment of a fluid flow pressure detecting device 10 is interposed in a fluid flow line between conduits or pipes 11 and 11'. The device 10 is substituted directly for the flanged fittings which, ordinarily, would be connected to pipes 11 and 11' to form a union therebetween. The device 10 includes a fitting 12 connected to the pipe 11 and including a neck portion 13 and a flange 14 having an end face 15 (see Fig. 3). The device 10 also includes a fitting 16 connected to the pipe 11' and including a neck portion 18 and a flange 20 having an end face 21 (see Fig. 3). A pipe union is effected with the flanges 14 and 20 of the fittings 12 and 16, respectively, secured together with an intervening gasket 22, for example, by means of bolts 24.

The device 10 is adapted for developing the velocity pressure and includes a first nozzle 26 disposed within the flange 14 as by an annular threaded joint 28 and an annular lip 30 which seats within an annular groove 33 in the flange 14. The nozzle 26 has an end face 34 which is substantially flush with and, in any case, does not extend beyond the face 15 of the flange 14. A second similar nozzle 38 is disposed within the flange 20, for example by means of a threaded joint 40. The nozzle 38 has an annular lip 42 which seats in an annular groove 44 in the flange 20. The nozzle 38 has an end face 46 which is thus substantially flush with and does not extend beyond the end of the face 21 of the flange 20.

The nozzle 26 has a sharp circular leading edge 50 and a fluid flow passage 52 which is tapered in diameter from a maximum diameter at the leading edge 50 to a minimum diameter in the vicinity of the end face or trailing edge 34 and including a throat portion 56 of constant minimum diameter. The nozzle 38 is similarly provided with a sharp circular trailing edge 58 downstream and a fluid flow passage 60 which tapers from a maximum diameter at the trailing edge to a minimum diameter including a throat portion 62 of the constant minimum diameter in the vicinity of the opposite edge or end face 46. The nozzles 26 and 38 are aligned so that the fluid flow passages 52 and 60 are axially aligned and provide a smooth passage for fluid.

The nozzles 26 and 38 are provided with notches or openings 64 and 66, respectively, adapted to receive a wrench or the like by means of which the nozzles may be tightened in position, removed or the like.

The relationship between the nozzles 26 and 38 and the inner portions of the flanges 14 and 20 provide Venturi-type action as follows. The external surface 68 of the nozzle 26 is tapered from the leading edge 50 to the region of attachment with the flange 14 at the threaded union 28 so that the nozzle 26 has, generally, the shape of a truncated cone. The surface 70 of the nozzle 38 is similarly tapered so that the nozzle 38 is also generally in the form of a truncated cone.

The fitting 12 has a passage portion 72 of a constant diameter of the same magnitude as the diameter of the pipe 11. The fitting has a tapered annular surface 74 which is tapered outwardly so that the annular passage 76 between the wall of the fitting and the wall of the nozzle 26 expands into an annular impact pressure chamber 78 in the flange 14. Similarly, the fitting 16 has a passage which has a portion 80 of the same diameter as the pipe 11'. The fitting 16 also has a tapered annular surface 82 such that the annular pressure communicating passage 84 between the fitting and the nozzle 38 expands into an annular static pressure chamber 86. The leading edge 50 and trailing edge 58 of the nozzles 26 and 38, respectively, are positioned within the portions of the fittings 12 and 16, having the same internal diameter as the pipes 11 and 11' respectively.

The flange 14 has a plurality of, for example two, radial pressure tap passages 88 and 90 extending from the annular pressure chamber 78 to the periphery thereof where they are provided with pipe extensions 92 and 94, respectively, in any convenient fashion. The flange 20 similarly has two radial pressure tap passages 96 and 98 extending from the pressure chamber 86 to the periphery thereof where they are provided with pipe extensions 100 and 102, respectively. Referring to Fig. 1, in a completed operative fluid flow assembly including the apparatus of the invention, the pipe lines 92 and 94 are interconnected by a line 104 and are then connected by a line 106 to one end 108 of a manometer 109 or to some other fluid pressure measuring, indicating, or registering device. Similarly, the pipe lines 100 and 102 are interconnected by a line 110 and are further connected by a line 112 to the other end 114 of the manometer 109. Suitable valves and drain lines are provided as required.

The device 10 shown in Fig. 3 is adapted for developing the velocity pressure. The fluid flowing in the pipe 11 passes through the passages 52 and 60 in the nozzles 26 and 38, respectively, and out through the pipe 11'. The velocity pressure is obtained by comparing the impact pressure with the static pressure in the fluid flow line. The fluid impact pressure is the pressure to which an open-ended tube known as an impact tube is exposed when the tube is pointed into the flowing stream of fluid. Static pressure in the fluid flow line is the pressure of the fluid at rest or flowing in a main pipe with parallel sides of sufficient length to insure undisturbed flow. Static pressure is generally measured in such a line at a hole in the pipe wall which extends perpendicularly to the flow in the line or has such a configuration that the fluid does not flow into the hole in the wall with a velocity component. In the device 10, the impact pressure is developed in chamber 78 and in the pressure taps 88 and 90 in the flange 14, and the static pressure is developed in the chamber 86 and in the pressure taps 96 and 98 in the flange 20.

The impact pressure is obtained in the chamber 78 in the following manner. The nozzle 26 operates as a fluid flow constricting mechanism and the sharp edge 50 thereof is disposed within the flow passage in the fitting 12 and its axis is aligned with the axis of the pipes 11 and 11' and the fittings 12 and 16. In addition, the diameter of the opening 50 is smaller than the inside passage diameter of the pipe 11 and fitting 12 and is directly in the path of fluid flow. Thus, the nozzle 26 is an open-ended impact tube pointed into a flowing stream of fluid. With the nozzle 26 thus designed and positioned, impact pressure is exerted on the nozzle and on the annular expanding pressure communicating passage 76 between the outer wall of the nozzle and the inner wall of the flange 14.

Thus, the annular, expanding pressure communicating passage 76 and the pressure chamber 78 are substantially directly in line with and communicate with the fluid flow in the pipe 11 so that the impact pressure is imposed directly on the pressure chamber 78 and on the radial pressure tap passages 88 and 90 in the flange 14.

The "impact" pressure in chamber 78 and the "static" pressure in chamber 86 are not the pressures usually associated with these terms but are terms applied to specific pressures in the present application. Both the "impact" and "static" pressures will be less than the pressures normally associated with such terms.

On the other hand, the sharp trailing edge 58 of the nozzle 38, smaller in diameter than the inside diameter of the pipe 11' and axially aligned therewith and positioned downstream in the fluid flow line, provides a minimum of turbulence in impressing the static pressure on chamber 86 and facilitates the development of static pressure in the annular expanding pressure communicating passage 84 between the outer wall of the nozzle 38 and the inner wall of the flange 20. The passage 84 is, in effect, an opening in the wall perpendicular to the flow as described above so that static pressure is obtained with greater accuracy in the pressure chamber 86 and radial pressure tap passages 96 and 98 in the flange 20. The throat passages 56 and 62 in nozzles 26 and 38, respectively, having the same uniform cross-sectional area further promote obtaining static pressure downstream by overcoming and eliminating turbulence and providing laminar flow.

It is desirable that the velocity pressure created by the flow-constricting nozzle shall be representative of the average velocity of the fluid flowing through the pipe 11. The sharp edge of the nozzle and its position in the fluid flow line modifies the usual central high maximum velocity along the longitudinal axis of the flow line to achieve substantially a fluid pressure in chamber 78 which is a function of this average velocity of the fluid.

The position of nozzle 26 in the fluid flow passage near the inner wall of pipe 11 and fitting 12 determines the amount of disturbance of the fluid flow and the change in its streamlines. The leading edge 50 of the nozzle 26 presents an annular impact area which is close to the internal wall of the pipe 11 and is thus designed to receive the effect of a combination of viscous and dynamic forces. When the fluid velocity is low, the lines of flow across the pipe are straight and parallel to the axis of flow. The sharp-edged nozzle disturbs the streamlines of flow however. If, therefore, the flow were laminar before it reached the nozzle 26, it would change to turbulent flow.

In Fig. 3 the diameter of pipe 11 is shown to be equal to that of pipe 11'. It is conceivable that if located in the juncture of a main line and a branch line that the former would have a larger flange and therefore pipe 11 could be greater than pipe 11'. Also, where a flow line is reduced to a smaller sized flow line. Such differences are answered by proportionate parts, and it is understandable that the velocity in one nozzle may therefore differ that the in the other.

The above-described operation of the device 10 may be achieved in the same way if the direction of the fluid flow is reversed.

The nozzles 26 and 38 may be held in place within the flanges 14 and 20, respectively other than by means of a threaded joint, for example, by means of a force fit.

What is claimed is:

1. A fluid flow metering device comprising: a first pipe fitting having an axial passage therethrough and having an annular chamber recessed from the surface of said passage and communicating with said passage adjacent one end of said fitting; a second pipe fitting having an axial passage therethrough and having an annular chamber recessed from the surface of said passage and communicating with said passage adjacent one end of said second pipe fitting; a nozzle mounted in each pipe fitting at said one end; each nozzle having an axially extending body portion projecting into the passage of said pipe fitting from said one end and having a terminal end terminating at an axial position in said passage beyond said annular chamber; each nozzle having an external surface spaced from the surface of said passage and tapering from a first diameter adjacent said one end of said pipe fitting to a smaller diameter at said terminal end; each nozzle having an axial passage therethrough of diminishing cross-section from said terminal end to the other end; means securing said one ends of said pipe fittings in fluid tight relationship with said axial passages of said nozzles in coaxial communication; each pipe fitting having a passage therein communicating with said annular recess and opening through the outer surface of the pipe fitting.

2. A fluid flow metering device comprising: a pair of pipe fittings, each having an axial passage therethrough, each axial passage having an inner wall portion tapering outwardly toward one end of the fitting and terminating in an annular recess communicating with said passage adjacent said one end of said fitting, each fitting further having at least one passage therein communicating with said annular recess and opening through the outer surface of said fitting; a nozzle mounted in said one end of each pipe fitting; each nozzle having an axial body portion projecting into the axial passage of its pipe fitting and having a free end terminating in an axial position in its passage from said one end beyond said annular recess and said tapering wall portions; each nozzle having an opening therethrough decreasing in cross-section from said free end and having an external surface tapering from a point adjacent said one end of each pipe fitting to a smaller diameter at said free end, the external surface of each nozzle forming with said tapering portion of its pipe fitting passage an annular passage of increasing cross-section from the end thereof adjacent said pipe fitting passage to the end thereof opening into the annular chamber; and means securing said one ends of said pipe fittings in fluid tight relationship with the openings through said nozzles in coaxial communication.

References Cited in the file of this patent

UNITED STATES PATENTS

| | | |
|---|---|---|
| 1,195,915 | Damrow | Aug. 22, 1916 |
| 1,698,314 | Mapelsden | Jan. 8, 1929 |
| 1,850,030 | Pardoe | Mar. 15, 1932 |
| 1,904,333 | Smith | Apr. 18, 1933 |
| 2,284,013 | Pardoe | May 26, 1942 |
| 2,487,083 | Warshaw | Nov. 8, 1949 |
| 2,561,700 | Hughes | July 24, 1951 |
| 2,614,423 | Carbone | Oct. 21, 1952 |
| 2,842,962 | Dall | July 15, 1958 |

FOREIGN PATENTS

| | | |
|---|---|---|
| 781,521 | France | Feb. 25, 1935 |
| 296,946 | Germany | Mar. 12, 1917 |